United States Patent Office 3,333,206
Patented July 25, 1967

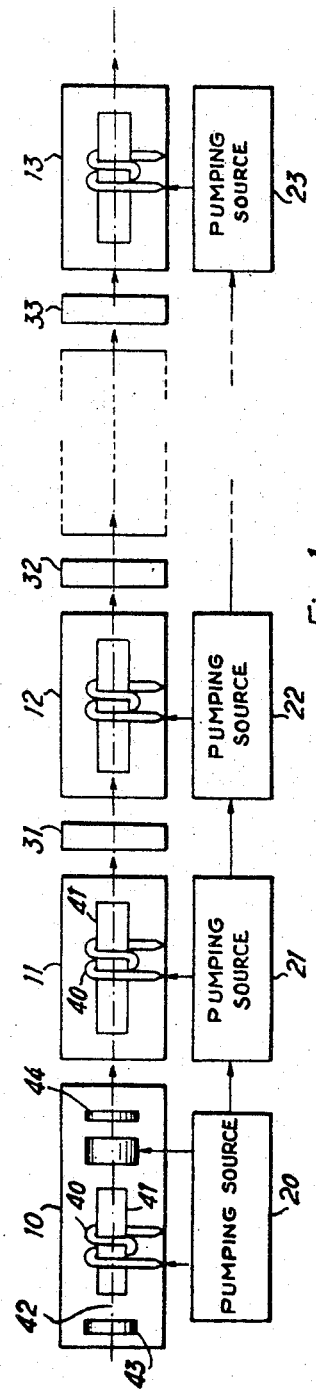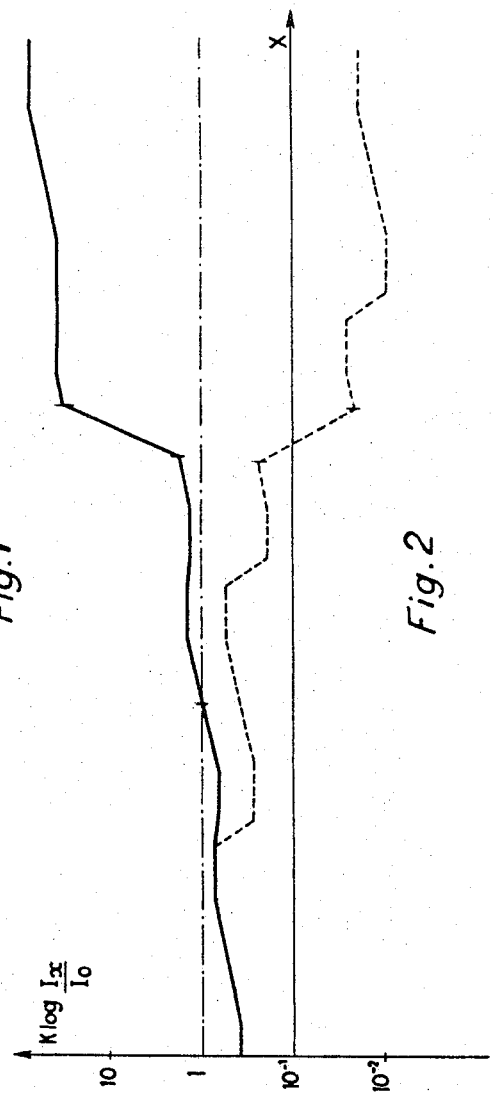

3,333,206
STABLE TRAVELING WAVE AMPLIFIER FOR PULSED LASERS
Georges Bret and François Gires, Paris, France, assignors to CSF—Compagnie Generale de Telegraphie Sans Fil, a corporation of France
Filed Mar. 19, 1965, Ser. No. 441,095
Claims priority, application France, Mar. 20, 1964, 968,038
4 Claims. (Cl. 330—4.3)

The present invention relates to pulsed, stimulated emission light sources, or lasers. As is well known, great difficulties have been met in the construction of amplifiers for such lasers and it is, therefore, an object of this invention to provide such an amplifier which is simple to operate.

According to the invention there is provided an amplifier for pulsed lasers comprising a plurality of active bodies, respectively associated with pumping sources and separated from each other by bodies whose transmission coefficient is a direct function of the intensity of the incident beam of light.

For a better understanding of the invention and to show how the same may be carried into effect reference will be made to the drawings accompanying the following description and in which:

FIG. 1 shows schematically a high spectral density and high amplitude system including a laser and an amplifier according to the invention; and FIGS. 2 to 4 are explanatory diagrams.

FIG. 1 shows a pulsed stimulated emission source of light or pulsed laser 10, associated with an amplifier arrangement according to the invention.

Figure 3:
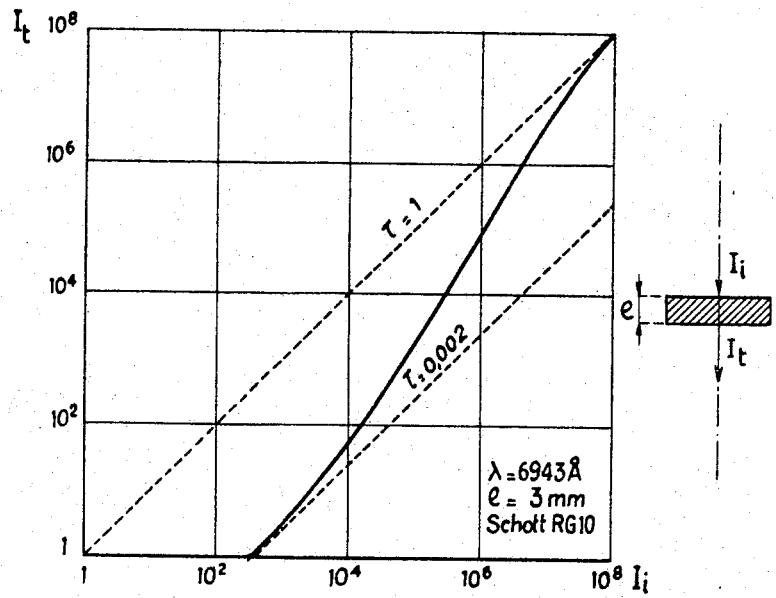

As well known in the art, pulsed laser 10 broadly comprises a pulsed power source 20 feeding a flash lamp through the coils of which extends an active body 41 such as a ruby. Ruby 41 is located within a cavity 42, whose end walls are respectively provided with a mirror 43 and a partly transparent mirror 44. Between mirror 44 and ruby 40 is positioned a shutter arrangement, for example a Kerr cell, which prevents the propagation of light towards mirror 44 at predetermined instants.

All this is well known in the art. In the system of FIG. 1 an amplifier arrangement according to the invention is associated with laser 10.

The amplifier arrangement of FIG. 1 comprises $n$ units 11, 12, 13 . . . each comprising an active body, such as a ruby 41, submitted to the action of a power source or pump in the same manner as in conventional lasers extending to this end through the coils of a flash lamp 40. Lamps 40 are respectively fed by pulsed sources 21, 22, 23 . . . , which are triggered by source 20 in such a manner that lamps 40 are flashed in turn at the instant the luminous pulse generated by laser 10 reaches the ruby 41 which extends through the lamp considered. In other words each unit 11 to 13 is similar to laser 10, except that there are no mirrors and no Kerr cell. Between the $n$ units 11 to 13 are respectively inserted plates 31, 32, 33 . . . of such a nature that their transmission coefficient increases as a single-valued function for all values of the intensity of the incident beam of light, as shown in FIGURE 3. Further, plates 31, 32, 33 are of such a nature that the transmission coefficient is reversible for different values of beam intensity—that is, after the transmission coefficient has been increased to a certain value from an original, smaller value, the transmission coefficient will return to the original value after the light intensity is reduced to its original value corresponding to the original value of the transmission coefficient, see FIGURE 3.

For example, plates 31, 32, 33 are made of a glass known as Schott RG 10. As is well known this kind of glass includes semiconductive impurities.

FIG. 3 shows, by way of a non-restrictive example, the variation curve of the transmission coefficient $\tau$ of this material, $I_t$ being the intensity transmitted and $I_i$ the incident intensity. $\tau$ is a single value, increasing function of $I_i$.

Figure 4:
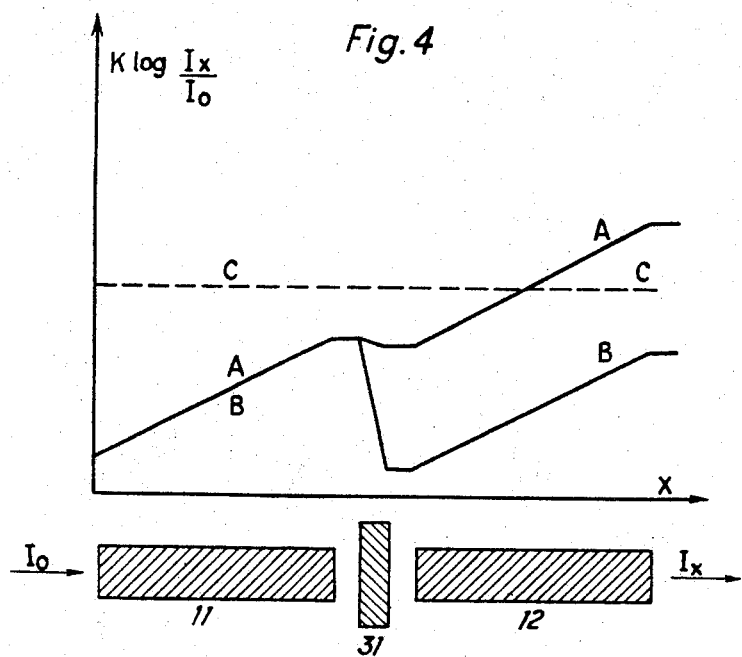

FIG. 4 is a part of the diagram of FIG. 2 showing the two behaviours of strips 31 to 33, $I_0$ being the input light intensity and $I_x$ the intensity at abscissa X.

The curve of FIG. 2 shows in relative units the evolution of the intensity $I_x$ of the beam of light which propagates through an amplifier arrangement, such as that shown in FIG. 1, but comprising no strips 31 to 33 or in which all such strips are simultaneously transparent to the incident light, $I_0$ being the intensity admitted at the input of the amplifier system. The full line curve refers to a strong light beam, i.e. such that strips 31 to 33 are transparent and the dotted curve to a beam of lower intensity; the dash-dot line shows the level of the instability threshold. When this threshold is exceeded the amplifier behaves as an oscillator at the expense of the gain provided by the active medium and cannot function as an amplifier.

FIG. 4 is part of the diagram of FIG. 2 showing the two behaviours of strips 31 to 33, $I_0$ being the input light intensity and $I_x$ the intensity at abscissa X.

Let G be the gain of one amplifier section such as 11, for example, $\tau_0$ the transmission coefficient of an attenuation strip at low light intensities, and $\tau_I$ the transmission coefficient of the same strip under strong illumination.

At low intensities stability is ensured by adjusting the various parameters of the amplifier stage, which is expressed by the formula $$G\tau_0 < 1$$

In FIG. 4 line CC is the oscillation threshold. For a low intensity of light there is no oscillation, the operation curve being BB. At high light intensities strip 31 is highly transparent and amplification exceeds threshold CC along the operation curve AA. However, contrary to what happened in FIG. 2 no oscillations or at least no significant oscillations occur.

Applicants believe that this is due to the fact that, in view of the high transmission coefficient of plates 31 to 33 caused by intense incident beam of light, all the energy gathered in the active body under the action of the pulsed pumping source is too rapidly disposed off for oscillations to occur.

Referring now again to FIG. 1, the arrangement operates as follows:

Generators 20, 21, 22 and 23 feed the gas discharge tubes 40; this produces the optical pumping of the active material bodies 40. Since strips 31, 32, 33 . . . have a high absorption coefficient $\tau_0$, pumping can proceed with no risk of self-oscillation. When the various materials have been sufficiently activated, laser 10 is triggered into action, as well known in the art. A beam of coherent light of high spectral intensity passes through the amplifier units and lowers in turn the absorbing power of strips 31, 32, 33 . . . . As it passes through the activated material bodies 11, 12, 13, the beam gains intensity and the output intensity can be expressed by a relation of the type $$\frac{I_n}{I_0} = G^n \tau_I^{n-1}$$

where:
$\tau$ is about 1, and
G is greater than 1.

When the pulse transmitted by laser 10 has propagated, the system returning to its initial state, the amplifier units are isolated from each other by strips 31 to 33.

Of course, the invention is not limited to the embodiment described and shown which was given solely by way of example.

What is claimed is:

1. A high power amplifier for pulsed lasers, comprising in combination: a plurality of aligned active bodies, pumping means respectively associated with said bodies, and a plurality of strips respectively interposed between said active bodies, said strips being of a material, whose transmitting power is a single valued, reversible, increasing function for all values of the intensity of the light supplied thereto from said active bodies.

2. A high power amplifier for pulsed lasers, comprising in combination: a plurality of aligned active bodies, pulsed pumping means respectively associated with said bodies, a plurality of strips respectively interposed between said active bodies, said strips being of a material, whose transmitting power is a single valued, reversible, increasing function for all values of the intensity of the light supplied thereto from said active bodies, and means for sequentially operating said pulsed pumping means.

3. A system comprising in combination: a pulsed laser including first pulsed pumping means and having an output, a plurality of aligned active bodies, said plurality having an input coupled to said output, further pulsed pumping means respectively associated with said bodies, a plurality of strips respectively interposed between said active bodies said strips being of a material, whose transmitting power is a single valued, reversible, increasing function for all values of the intensity of the light supplied thereto from said active bodies, and means for controlling said further pumping means by said first pumping means for a sequential operation thereof.

4. A high power amplifier for pulsed lasers, comprising in combination: a plurality of aligned active bodies. pumping means respectively associated with said bodies, and a plurality of strips respectively interposed between said active bodies, said strips being of a material whose transmitting power is a single valued, reversible, increasing function for all values of the intensity of the light supplied thereto from said active bodies, and said material being a glass containing semiconductor impurities.

References Cited

UNITED STATES PATENTS

| 3,214,702 | 10/1965 | Maurer | 330—4.3 |
| 3,247,459 | 4/1966 | Van Overbeek | 330—4.3 |

OTHER REFERENCES

Sorokin; "IBM Technical Disclosure Bulletin," vol. 7, No. 3, August 1964, p. 230.

ROY LAKE, *Primary Examiner.*

NATHAN KAUFMAN, DARWIN R. HOSTETTER,
*Examiners.*